United States Patent

[11] 3,574,327

| [72] | Inventor | Michele Golfi<br>149 Simcoe St. East, Hamilton, Ontario, Canada |
|---|---|---|
| [21] | Appl. No. | 809,198 |
| [22] | Filed | Mar. 21, 1969 |
| [45] | Patented | Apr. 13, 1971 |

[54] LOADER
2 Claims, 2 Drawing Figs.

| [52] | U.S. Cl. | 198/8 |
|---|---|---|
| [51] | Int. Cl. | B65g 65/06 |
| [50] | Field of Search | 198/8, 12, 13, 14, 36 |

[56] References Cited

UNITED STATES PATENTS

| 1,090,418 | 3/1914 | Schneider | 198/8 |
|---|---|---|---|
| 1,573,125 | 2/1926 | Robbins | 198/8 |
| 2,670,070 | 2/1954 | Decat | 198/8 |

*Primary Examiner*—Robert G. Sheridan
*Attorney*—Westell and Hanley

ABSTRACT: A mobile apparatus, for collecting and loading loose material, which is adapted to locate the intake of a conveyor at the site of the loose material for transfer rearwardly to a loading point. An endless feeder for the conveyor, located above the intake, is maneuverable forwardly and rearwardly, laterally, and vertically to reach material in the area of the conveyor intake.

PATENTED APR 13 1971

3,574,327

INVENTOR.
MICHELE GOLFI.
BY Westell & Hanley

LOADER

The present invention relates to mobile apparatus for collecting and transferring loose material such as by loading the material for transportation away from the collection site.

Apparatus presently known or in use for collecting loose material such as sand or gravel and continuously loading it on trucks or the like for transportation away from the collection site include mobile loaders employing a feeder to collect the material onto a continuous conveyor which transfers the material to an elevated point and empties it into the cartage vehicle. Such a loader is disclosed in U.S. Pat. No. 2,696,287 issued Dec. 7, 1954 to L. E. Faust which shows a continuous conveyor and an endless feeder associated with the conveyor, both the conveyor and feeder being vertically adjustable. Such mobile loaders are limited in their flexibility of operation since the operator must align the material to be collected, the conveyor intake and feeder, and the conveyor discharge and cartage vehicle, all at the same time. To increase the flexibility of this type of apparatus, it has been suggested to provide separate intake and discharge conveyors with one or the other being adjustable laterally (as well as vertically), but such loaders remain restricted in operation by the fact that the feeder is an adjunct of the intake conveyor and operates within the limitations of the intake conveyor.

It is an object of the present invention to provide a mobile apparatus, for loading loose material, which has improved flexibility for collecting the material and for feeding it onto conveyor means of the apparatus.

In the accompanying drawings, which show an example embodiment of the invention:

Figures 1, 2:
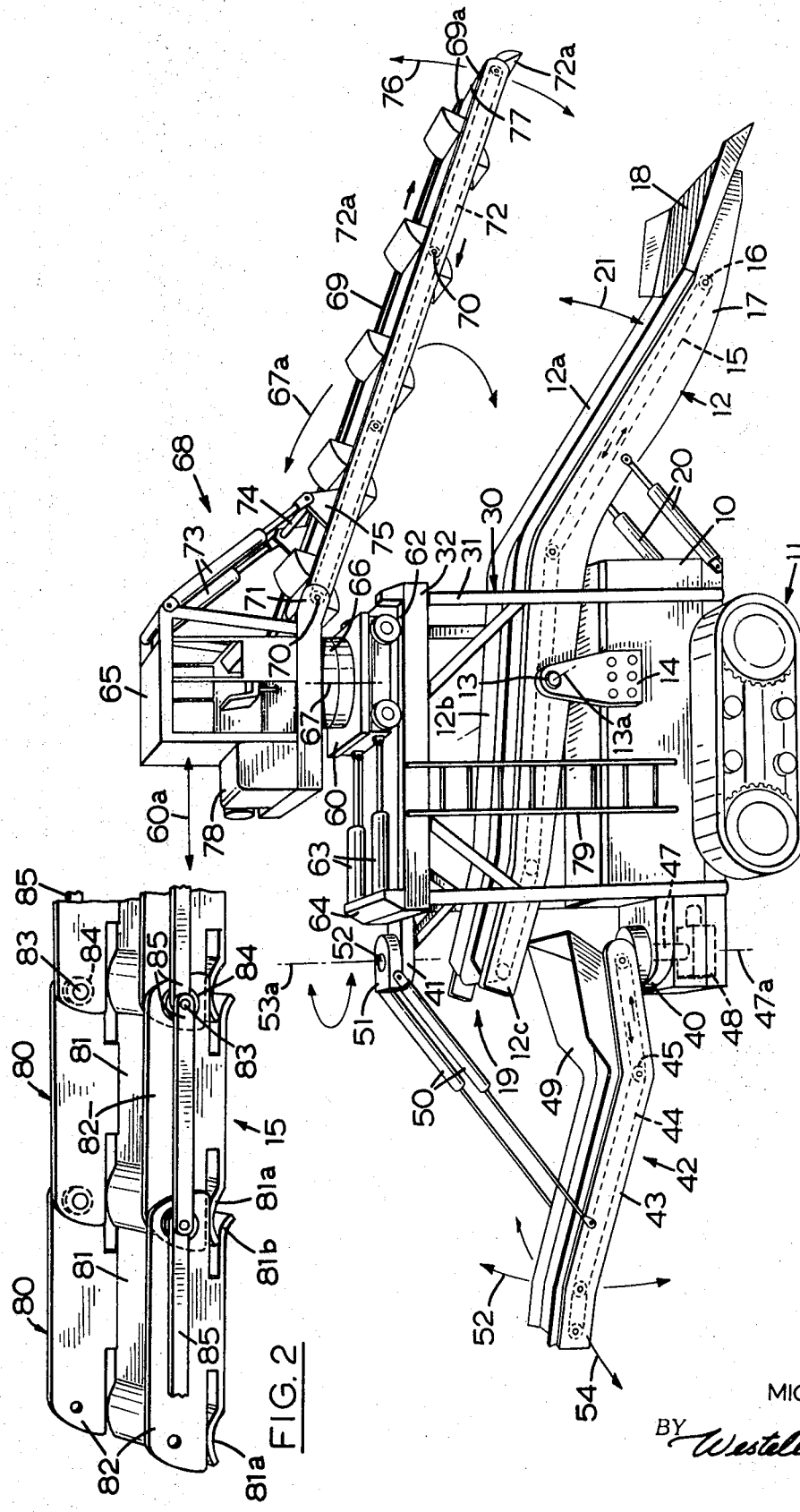
FIG. 1 is a side view in perspective of a collecting and loading apparatus.
FIG. 2 is a view in perspective of a portion of a conveyor belt for use with the apparatus in FIG. 1.

The apparatus shown in the drawings consists of a body or main frame 10 supported on traction means in the form of a pair of endless tracks 11 suitably driven by power means, such as a motor (not shown), mounted on the chassis.

An upwardly and rearwardly inclined continuous intake conveyor 12 is mounted on main frame 10 and projects both forwardly and rearwardly of the main frame in the normal direction of movement of the apparatus on tracks 11. Intake conveyor 12 is pivotally supported by laterally projecting trunnions 13 which are journaled in a pair of spaced, upwardly projecting brackets 14 fixed on main frame 10. Intake conveyor 12 consists of an endless belt 15 supported and driven by idler rollers and drive rollers 16 which are journally mounted on a frame 17 in known manner, as indicated schematically in FIG. 1 of the drawings. Conveyor frame 17 is angled to form an upwardly inclined front portion 12a on which an intake apron 18 is mounted, a substantially horizontal central portion 12b to which trunnions 13 are fixed, and an upwardly inclined short rear portion 12c terminating in an outlet 19 overhanging the rear end of main frame 10. A pair of hydraulic jacks 20 operatively connect main frame 10 with conveyor 12, one end of each jack being pivotally connected to the main frame and the other end of each jack being pivotally connected to conveyor frame 17 forwardly on the frame, in a manner such that the forward end of the conveyor carrying apron 18 is movable through a vertical arc as indicated by arrow 21 from a lower position of apron 18 resting on the traction and material-bearing surface, the conveyor being pivotable about horizontal axis 13a of trunnions 13.

A secondary frame or superstructure 30 is mounted on main frame 10 and straddles conveyor 12 which is also mounted above the main frame. Superstructure 30 consists of a plurality of columns or legs 31 fixed at their lower ends to main frame 10 and supporting at their upper ends a platform 32 which is vertically spaced from conveyor 12. Main frame 10 and superstructure 30 carry rearwardly projecting shelves 40 and 41 respectively which support a discharge conveyor 42 consisting of a frame 43 supporting an endless belt 44 on idler and drive rollers 45 in known manner, as indicated schematically in FIG. 1 of the drawings. One end of frame 43 of conveyor 42 is mounted on a hub 46 for vertical pivotal movement of the frame, while the hub is mounted on shelf 40 by a vertical shaft 47 rotatable about its axis 47a by drive means on frame 10 acting through a gear box 48. The end of conveyor 42 carrying hub 46 also carries raised wings forming a hopper 49 located directly below outlet 19 of main conveyor 12. Frame 43 of the discharge conveyor is operatively connected to shelf 41 by a pair of hydraulic jacks 50, each of which is pivotally connected at one end to frame 43 and at the other end to a hub 51 mounted on shelf 41, in a manner such that frame 43 is movable through a vertical arc as indicated by arrows 52. Hub 51 is fixed to a vertical shaft 53 journaled in shelf 41 for free rotational movement of the hub horizontally about the vertical axis 53a of the shaft which is coincident with axis 47a of shaft 47 engaging shelf 40. Thus discharge conveyor 40 is horizontally pivotable in the direction of arrows 54.

Platform 32 carries on its upper surface a wheeled carriage 60 movable along a pair of tracks 62 fixed to the platform. Carriage 60 is movable forwardly and rearwardly in the direction of arrows 60a (with reference to the apparatus as a whole) by a pair of hydraulic jacks 63 which are each operably connected at one end to the carriage and at the other end to an abutment 64 fixed to the upper surface of the platform at its rear end portion. A cab 65, housing the controls for operating the apparatus, is fixed on a base 66 which is pivotally mounted on carriage 60 for rotation about a vertical axis 67 in the direction of arrows 67a. Extending forwardly from cab 65 is a feeder 68 which consists of a frame 69 having a pair of parallel boom arms 69a pivoted at one end by horizontally disposed pins 70 journaled in brackets 71 which are integral with the cab. Boom arms 69 are spaced apart by journaled driving and idler rollers 71a which carry an endless belt 72 of spaced-apart buckets 72a in known manner, as indicated schematically in FIG. 1 of the drawings. Feeder 68 is suspended, as a cantilever pivotable about pins 70, by a pair of hydraulic jacks 73 which are each operatively connected at one end to cab 65 and at the other end to a horizontal bar 74 journaled in a pair of brackets 75 fixed one to each boom arm 69 at a point spaced from pins 70, enabling the feeder to be pivotally movable in a vertical arc in the direction of arrows 76. The length of feeder 68 is such that its free end 77 reaches beyond apron 18 of conveyor 12 when jacks 63 are extended and the end of the feeder is lowered to ground level by extending jacks 73, while the stroke of jacks 63 are of sufficient length to withdraw carriage 60 rearwardly along tracks 62 until the free end of the feeder is contiguous with apron 18 of conveyor 12.

Endless belt 15 may be a single unitary continuous band as indicated schematically in FIG. 1 of the drawings or it may be an articulated continuous band composed of articulated links, as seen in FIG. 2 of the drawings, which shows links 80 each having a bottom 81 and a pair of opposed sidewalls 82, the bottom being humped at its forward end 81a and depressed at its rearward end 81b. Links 80 are pivotally interconnected by lateral pins 83 which carry at each end, on the outside of walls 82, a journaled guide wheel 84. Guide bars 85 located on the outside of walls 82 and wheels 84, are pivotally mounted and interconnect successive pins 83. In the operation of belt 15 as described, guide wheels 84 run on side tracks (not shown) fixed longitudinally on frame 17 of conveyor 12 and are retained on the side tracks, especially where the belt is longitudinally curved in its travel, by suitable overhanging flanges fixed on the tracks. Humped forward portions 81a and depressed rearward portions 81b of links 81 enable belt 15 to be longitudinally curved in its travel about frame 17 of conveyor 12.

Endless belt 44 may also be constructed in the articulated manner described above. The construction of endless belt 72 may take the form of belt 15 as described, but replacing links 80 with a succession of buckets 72a each journally mounted on a lateral pin 83 and/or fixed to guide bars 85.

An auxiliary drive motor 78 mounted on cab 65 provides power for the operation of the cab and endless belt 72 of feeder 68. Power for the operation of endless belts 15 and 44 of conveyors 12 and 42 is drawn from the power source mounted on main frame 10 of the apparatus. Hydraulic power for jacks 20, 50, 63 and 73 is provided by suitable means, not shown, mounted on main frame 10. Suitable ladder means 79 are supplied to enable the operator of the vehicle to reach cab 65.

In the operation of the described embodiment, movement of the apparatus to the site of loose material is preceded by raising conveyor 12 in the upward direction of arrow 21, by extending hydraulic jacks 20 and pivoting the conveyor about trunnions 13, to clear apron 18 from the surface over which the apparatus is to travel. The apparatus is moved on tracks 11 to the loading site whereupon conveyor 12 is lowered, by retracting jacks 20, to rest apron 18 on the ground adjacent the loose material. Cartage vehicles (not shown) are maneuvered into position beneath the arc of traverse of the free end of discharge conveyor 42 and the discharge conveyor is then swung over the hopper of the vehicle, by the action of gears 48, in the direction of arrows 54, the free end of the conveyor being adjusted to a suitable height above the vehicle hopper, in the direction of arrows 52, by the operation of hydraulic jacks 50.

Feeder 68 is moved into an operative position, depending upon the exact function it is to perform, by the cumulative adjustment of jacks 63, jacks 73 and the rotation of cab 65 about vertical axis 67. If feeder 68 is to draw loose material towards apron 18 of conveyor 12 then jacks 63 are extended to move carriage 60 forward on platform 32 in the forward direction of arrow 60a, and jacks 73 are adjusted to enable buckets 72a to reach the loose material as they pass around free end 77 of the feeder. To move the loose material onto apron 18, and across the apron onto endless belt 15, feeder 68 is lowered by extending jacks 73, and jacks 63 are retracted to draw carriage 60 in a rearward direction on tracks 62. The loose material may, of course, also be moved onto endless belt 15 of conveyor 12 by moving the apparatus in a forward direction on tracks 11. As the loose material is deposited on endless belt 15 it travels upwardly and rearwardly to output end 19 of conveyor 12 where it drops into hopper 49 of discharge conveyor 42 whereupon it travels on endless belt 44 and drops off the outlet end of the discharge conveyor into the hopper of the haulage vehicle. Forward movement of the apparatus into the loose material, to scoop the material over apron 18 to moving endless belt 15, is aided by the maneuverability of feeder 68 which may reach out beyond and above the apron to draw the loose material towards the apron. Thus a pile of loose material may be broken down by the action of buckets 72a to provide a more even flow of the material onto apron 18. Lateral pivoting of feeder 68 about vertical axis 67 of cab 65 further facilitates this operation. When the loading operation is not being carried out, or when it can be achieved by the forward movement of the apparatus without the aid of feeder 68, the feeder may be operated laterally of the apparatus, again by pivoting cab 65 about vertical axis 67, and in this way material located laterally of the apparatus can be worked by the feeder. For this purpose, and if necessary, for carrying out the other purposes of the feeder mentioned above, buckets 72a may be replaced by claws or any other device suitable for the purpose, mounted on belt 72 in a similar manner.

It will be appreciated that different types of loose material may be collected and loaded by the apparatus of the present invention, including snow.

I claim:
1. A mobile apparatus for collecting and loading loose material, comprising:
   a. a main frame and a superstructure mounted thereon;
   b. traction means supporting the frame and adapted to move the frame along a surface;
   c. endless conveyor means mounted on the frame and extending forwardly thereof the intake end portion of the conveyor means being adapted to rest on said surface and to receive loose material the output end portion of the conveyor means extending rearwardly of the frame and adapted to discharge gathered material into collecting means;
   d. endless material collecting and feeding means mounted on the frame and extending forwardly thereof above the conveyor means, said feeding means being adapted to engage material both forwardly and laterally of the conveyor means and adjustable to move the material onto the intake end portion of the conveyor means, the feeding means comprising a carriage movable forwardly and rearwardly on the superstructure, means mounted on the carriage for rotation about a vertical axis, a feeder frame pivotally mounted on a horizontal axis at one end of said rotational means and extending forwardly over the conveyor means, and endless means to pass spaced feeding elements continuously along the feeder frame and over the free end thereof for engagement with loose material; and
   e. means mounted on the frame to drive the traction means, conveyor means and feeder means.

2. A vehicle as claimed in claim 1 in which the superstructure includes a platform, a pair of rails on the platform, the carriage being adapted to be moved forwardly and rearwardly of the frame on the rails, the rotational means comprising a housing journally mounted on the carriage, the feeder frame being pivotally attached to the housing.